Patented Jan. 12, 1954

2,666,066

UNITED STATES PATENT OFFICE 2,666,066

ETHYLENEDIAMINE SALTS OF CYCLOPENTANOPOLYHYDROPHENANTHRENE - 3 - MONOSULFATES

Richard B. Hasbrouck, Waukegan, Ill., assignor to Abbott Laboratories, North Chicago, Ill., a corporation of Illinois No Drawing. Application September 28, 1951, Serial No. 248,892

10 Claims. (Cl. 260—397.4)

1

This invention relates to therapeutic preparations having hormone activity, and includes among its objects and advantages, compounds of increased stability, and methods for producing the same. Specifically, the invention relates to ethylenediamine salts of the half acid sulfate esters of cyclopentanopolyhydrophenanthrenes.

The compounds of the present invention are derived from hormone type steroids known as the cyclopentanopolyhydrophenanthrene series, which includes estrogenic steroids, such as estrone, estradiol, equilin, and equilenin; androsterones; pregnenolones; stereo-isomerides and derivatives thereof, etc.

According to the invention, stable organic salts of the cyclopentanopolyhydrophenanthrenes are produced, which are particularly suitable for oral administration. The salts are substantially odorless and inoffensive to the user. The salts are soluble in aqueous media and are stable therein.

Butenandt, Z. Physiol. Chem. 259, 222–34 (1939), during an investigation of estrone, prepared several alkaloid salts of estrone sulfate. The salts are quite insoluble in aqueous solutions and are not, therefore, particularly adapted for human consumption. A further disadvantage of these estrone salts if used for medication, is the fact that if any dissociation takes place in solution, the alkaloids thus liberated from the compounds produced the general alkaloid effects, which are undesirable. Some of the alkaloids used to produce the salts are extremely toxic or poisonous and therefore, impractical for use.

Generally, the compounds of my invention may be prepared from the known naturally occurring sodium steroid 3-monosulfate or from the steroids per se. The steroids may be sulfonated according to known procedures with such sulfonating agents as sulfur trioxide, chlorosulfonic acid, sulfamic acid, etc., and recovered as water-soluble salts, such as, sodium, ammonium, or other alkali or alkali metal salts. The salt is then reacted with ethylenediamine to produce the desired ethylenediamine cyclopentanopolyhydrophenanthrene-3-monosulfate.

The following examples illustrate in detail the present invention.

Example I

About 1.0 gm. of estrone and about 0.36 gm. of sulfamic acid are placed in a suitable reaction vessel such as an ordinary round-bottomed glass flask, with about 40 cc. of pyridine. Dimethylaniline may be substituted for the pyridine. The mixture is heated, with stirring, to about 95–100° C., and the heating is continued for about one-quarter to one and one-quarter hours. At the end of the heating period most of the pyridine is distilled off under light vacuum, the residue is cooled to room temperature and anhydrous ether is added. The dense, granular solid which is mainly ammonium estrone-3-monosulfate, plus a small amount of pyridine sulfamate, is filtered and dried.

To a solution of 0.45 gm. of ethylenediamine in 25 cc. of methanol is added 1.34 gm. of ammonium estrone-3-monosulfate, prepared in a manner similar to that described above. After allowing to stand a short time, the solution is filtered from the methanol-insoluble ethylenediamine sulfamate, and the filtrate clarified with decolorizing carbon. The filtrate thus obtained is concentrated in vacuum at about 50° C. to a volume of about 10 cc. To it is added slowly about 10 cc. anhydrous ether, which causes crystallization to occur. The product is filtered off, washed with a mixture of equal volumes of methanol and ether and dried. The ethylenediamine estrone-3-monosulfate is obtained as a colorless, crystalline product, which sinters at about 210° C., and melts incompletely at 230–232° C. The melting is still incomplete at 245° C.

The ammonium estrone sulfate is a very desirable intermediate in the process, as the ammonium group may be replaced by the ethylenediamine group. It is important that the basic group of the intermediate salt of the estrone sulfate be less basic than the ethylenediamine, otherwise no reaction will occur between the two compounds.

Example II

To a solution of 0.15 gm. of ethylenediamine in 10 cc. of methanol is added 0.30 gm. of ammonium estradiol-3-monosulfate (prepared similarly to the estrone salt of Example I). After being allowed to stand for a short time, the solution is filtered and then clarified with a small amount of decolorizing carbon. The clarified filtrate is concentrated to a volume of about 4–5 cc. and anhydrous ether added to it until precipitation is complete. The solid is filtered off, washed with a mixture of equal volumes of ether and methanol and dried. The product obtained is ethylenediamine estradiol-3-monosulfate.

Example III

To a solution of 0.10 gm. of ethylenediamine in 10 cc. of methanol is added 0.20 gm. of ammonium equilin-3-monosulfate (prepared similarly to the estrone salt of Example I). After the solution has stood for a short time, it is filtered and the filtrate clarified with a small amount of activated carbon. The solution is then concentrated under vacuum to a volume of about 4 cc., after which it is treated with anhydrous ether until no more precipitation of product occurs. The product is filtered off, washed with a mixture of equal volumes of ether and methanol and dried. The material thus obtained is ethylenediamine equilin-3-monosulfate.

*Example IV*

To a solution of 0.07 gm. of ethylenediamine in 10 cc. of methanol is added 0.125 gm. of ammonium equilenin-3-monosulfate (prepared similarly to the estrone salt of Example I). After standing a short time, the solution is filtered and clarified with a small amount of activated carbon. The clarified filtrate is concentrated under vacuum to a volume of about 2-3 cc. and anhydrous ether slowly added until no more product precipitates. The material is filtered off and washed with a mixture of ether and methanol and then dried. The product is ethylenediamine equilenin-3-monosulfate.

This application is a continuation-in-part of my copending application Serial No. 172,385, filed July 6, 1950, now abandoned, entitled "Therapeutic Substances and Process of Preparing the Same."

Others may readily adapt the invention for use under various conditions of service, by employing one or more of the novel features disclosed or equivalents thereof. As at present advised with respect to the apparent scope of my invention, I desire to claim the following subject matter.

I claim:

1. A therapeutic compound selected from the group consisting of ethylenediamine estrone-3-monosulfate, ethylenediamine estradiol-3-monosulfate, ethylenediamine equilin-3-monosulfate and ethylenediamine equilenin-3-monosulfate.

2. Ethylenediamine estrone-3-monosulfate.

3. Ethylenediamine estradiol-3-monosulfate.

4. Ethylenediamine equilin-3-monosulfate.

5. Ethylenediamine equilenin-3-monosulfate.

6. The process which comprises reacting a salt of a member of the group consisting of estrone-3-monosulfate, estradiol-3-monosulfate, equilin-3-monosulfate, equilenin-3-monosulfate with ethylenediamine.

7. The process which comprises, reacting ammonium estrone-3-monosulfate with ethylenediamine to produce ethylenediamine estrone-3-monosulfate.

8. The process which comprises, reacting ammonium estradiol-3-monosulfate with ethylenediamine to produce ethylenediamine estradiol-3-monosulfate.

9. The process which comprises, reacting ammonium equilin-3-monosulfate with ethylenediamine to produce ethylenediamine equilin-3-monosulfate.

10. The process which comprises, reacting ammonium equilenin-3-monosulfate with ethylenediamine to produce ethylenediamine equilenin-3-monosulfate.

RICHARD B. HASBROUCK.

No references cited.